Patented Nov. 7, 1922.

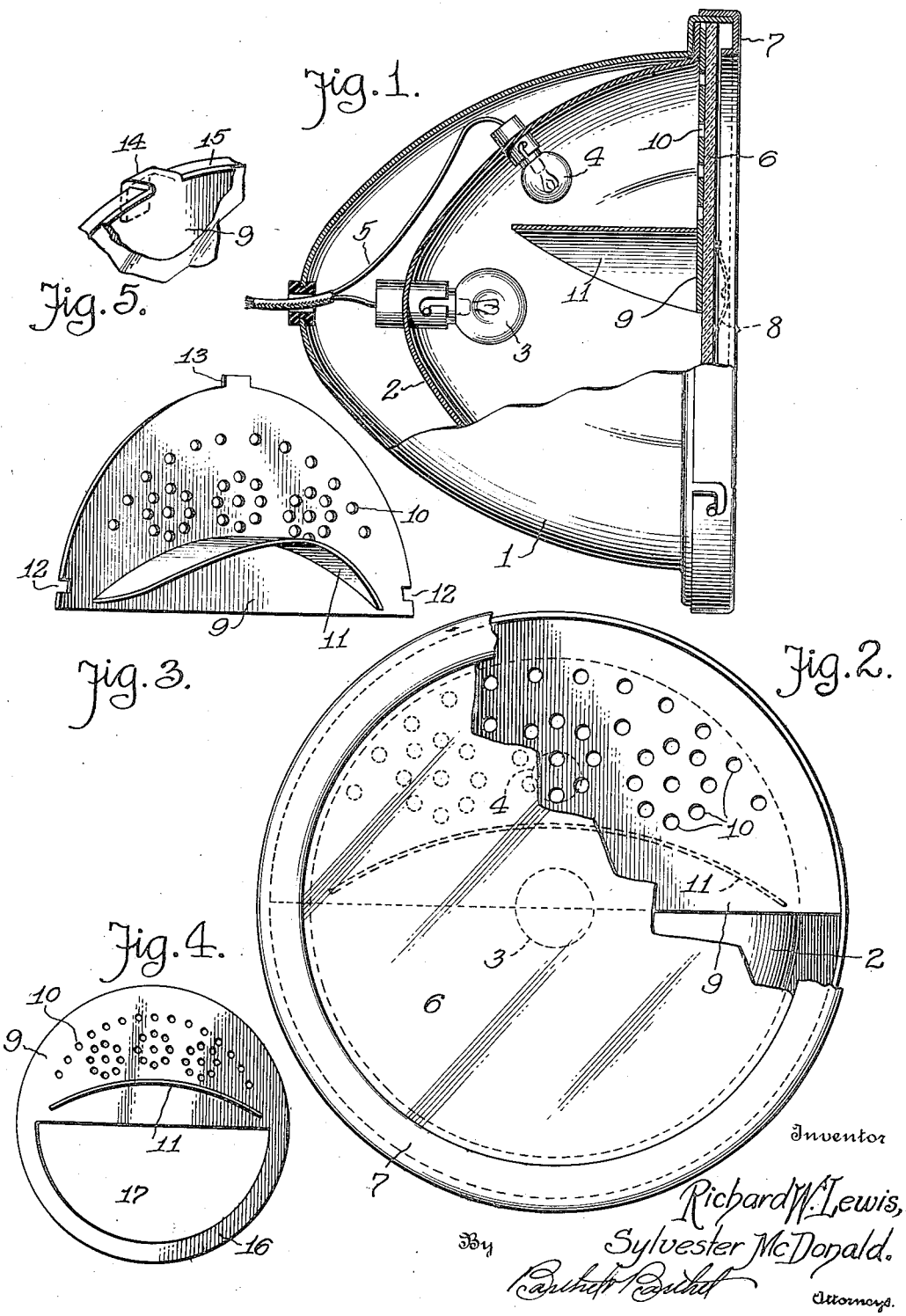

1,435,014

UNITED STATES PATENT OFFICE.

RICHARD W. LEWIS AND SYLVESTER McDONALD, OF DETROIT, MICHIGAN.

ANTIGLARE DEVICE.

Application filed February 4, 1921. Serial No. 442,356.

*To all whom it may concern:*

Be it known that we, (1) RICHARD W. LEWIS and (2) SYLVESTER McDONALD, (1) a citizen of the United States of America, (2) a subject of the King of England, residing at Detroit, in the county of Wayne and State of Michigan, have invented certain new and useful Improvements in Antiglare Devices, of which the following is a specification, reference being had therein to the accompanying drawings.

This invention relates to an anti-glare attachment for lamps, lanterns and headlights, particularly the latter when used in connection with automobiles and similar vehicles.

Our invention aims to provide a headlight attachment or anti-glare device which will cause rays of light emitted by a headlight to be cast towards the ground, in front of an automobile, thus eliminating a straight ahead glare which has been the cause of many accidents, particularly by pedestrians being temporarily blinded and bewildered to such an extent as to be run down by the automobile and injured. It is in this connection that our attachment or anti-glare device prevents the drivers of approaching cars or other vehicles from being temporarily blinded and losing control of their cars; it being a well known fact that many collisions are caused by glaring headlights.

Our invention further aims to provide a headlight attachment or anti-glare device which may be advantageously used in connection with headlights equipped with dimmers or auxiliary lamps, as provision is made in connection with the attachment or device so that the dimmers may be used in the usual manner without any interference by the main lamps of the headlights.

Our invention is further characterized by an attachment or anti-glare device that is applicable to various types of automobile headlights and may be easily and quickly installed without any danger of the attachment becoming accidentally displaced or detracting from the general appearance of the headlights.

The construction entering into our invention will be hereinafter described and then claimed, and reference will now be had to the drawings, wherein—

Figure 1 is a side elevation of a conventional form of automobile headlight, partly broken away and partly in longitudinal section;

Fig. 2 is a front elevation of the same, partly broken away;

Fig. 3 is a perspective view of our anti-glare device;

Fig. 4 is a front elevation of a modified form of device, and

Fig. 5 is a fragmentary perspective view of a portion of an anti-glare device, illustrating one way of attaching the device to a lens.

In the drawing, the reference numeral 1 denotes a headlight casing containing a reflector 2, a main lamp 3, a dimmer or auxiliary lamp 4, and suitable electrical connections 5 for the lamps 4 and 3. In the front of the headlight casing 1 is a lens 6 retained in the casing by a rim member 7 and yieldable clamping devices 8, and the elements 1 to 8 inclusive represent a conventional form of headlight in which our anti-glare device may be used. In this and other types of the headlights the reflector 2 causes rays of light emitted by the main lamp 3 to be cast straight ahead with such an intense glare that pedestrians or the drivers of approaching automobiles are temporarily blinded or bewildered by such glare. When the main lamp 3 is not in use, the auxiliary or dimmer lamp 4 affords sufficient illumination to detect the headlight at a short distance and in providing our anti-glare device we have aimed to utilize the full intensity of the main lamp 3 and simply reflect light rays therefrom in a direction other than straight ahead or in such directions as not to interfere with pedestrians or others in the path of the headlight carrying automobile.

Our anti-glare device, in its preferred form, as shown in Figs. 1, 2 and 3 comprises a semi-circular flat plate 9 made of any suitable material, preferably metal, and this plate is adapted to fit against the inner wall of the lens 6 at the upper portion thereof, so that the greater part of the upper portion of the lens 6 will be rendered opaque compared to the lower transparent exposed portion of the lens. The plate 9 has its upper portion provided with a series of apertures 10 which may be disposed in suitable groups and these apertures permit of rays of light from the auxiliary lamp or dimmer 4 passing through the plate 9 and the lens 6 so that the dimmer 4 may be utilized for the purposes intended. In some instances, however, particularly where headlights are devoid of auxiliary lamps or dimmers, the apertures 10 may be dispensed with. Then again, the apertures may be used to simply provide a dull light at the upper portion of the lens 6 as will hereinafter appear.

The rear wall of the plate 9, contiguous to its straight edge, has a rearwardly extending curved or arch shaped shield or reflector 11 which may be soldered, spot welded or otherwise connected to the plate 9 to remain rigid relative thereto, and as shown in Fig. 1, the shield 11 extends into a plane above the main lamp 3 and intersects the rays of light cast upwardly from said lamp. The shield or reflector 11 will cause the rays of light emitted by the greater part of the main lamp 3 to be reflected downwardly through the lower transparent portion of the lens 6, although some of the rays of light emitted by the upper side of the main lamp 3 will be utilized by the reflector 2 above the shield or reflector 11, especially when the headlight is devoid of the auxiliary lamp or dimmer 4.

Considering the manner of mounting the plate 9 against the inner wall of the lens 6, the means employed for holding the plate depends entirely upon the type of lamp in which it is installed. In some lamps the plate 9 may have the curved edges thereof provided with notches 12 or lugs 13 to interlock with or engage a portion of the headlight casing 1 or the reflector 2. Then again, the plate 9 may have lugs 14 of sufficient length to be bent over the edges of a lens 15, as shown in Fig. 5, whereby the plate 9 will be supported from the upper portion of the lens. One or more of these hook-shaped lugs may be employed to correctly position the plate 9.

In other types of headlights the semi-circular plate 9 may be slightly greater in area than that of a semi-circular plate, so that the straight edge of the plate will be in a plane below the horizontal medial plane of the headlight casing 1, and in consequence of such shape the side edges of the plate, adjacent the lower straight edge thereof, will support the plate within the casing and at the upper portion of the lens 6.

It is also possible to choose a disk or plate 16 that is circular with the upper portion thereof apertured, as in the preferred form of construction, and the lower portion thereof provided with a semi-circular opening 17. The lower edges of the plate 16 will rest on the bottom of the headlight casing and firmly support the plate in position.

As there are many ways of mounting an anti-glare device within a headlight casing, we do not care to confine ourselves to any specific fastening or holding means, other than that the device is retained against the inner wall of the lens 6, with the shield or reflector 11 projecting over the main lamp 3 of the headlight.

It is thought that the utility of our anti-glare device is apparent without further description, and while in the drawings there are illustrated the preferred embodiments of our invention, it is to be understood that the structural elements are susceptible to such changes in size, shape and manner of assemblage as fall within the scope of the appended claim.

What we claim is:—

The combination of a headlight casing having an open end, a reflector in said casing, a lens closing the open end of said casing, a main lamp axially of said reflector, an auxiliary lamp in said reflector and in a plane above said main lamp, a semi-circular perforated plate against the inner wall of said lens at the upper portion thereof, and an arch shaped shield solely supported by said perforated plate adjacent the straight edge of said perforated plate and extending to a point in an imaginary line between said main and auxiliary lamps so that rays of light from said main lamp may project into the upper part of said reflector.

In testimony whereof we affix our signatures in presence of two witnesses.

RICHARD W. LEWIS.
SYLVESTER McDONALD.

Witnesses:
ANNA M. DORR,
KARL H. BUTLER.